United States Patent
Sylla et al.

[11] Patent Number: 6,108,960
[45] Date of Patent: Aug. 29, 2000

[54] FISHING LURE

[76] Inventors: Brian P. Sylla, 502 Rolling Meadow Dr.; Randy A. Larson, W8974 770 Ave., both of River Falls, Wis. 54022

[21] Appl. No.: 09/169,880

[22] Filed: Oct. 12, 1998

[51] Int. Cl.[7] ............................ A01K 85/00; A01K 85/01
[52] U.S. Cl. ............................ 43/42.09; 43/17.6
[58] Field of Search .................. 43/17.5, 17.6, 43/42.09, 42.32, 42.33

[56] References Cited

U.S. PATENT DOCUMENTS

| | | | |
|---|---|---|---|
| D. 381,734 | 7/1997 | Murphy | D22/134 |
| 1,477,864 | 12/1923 | Bolton | 43/42.09 |
| 1,600,653 | 9/1926 | Steenstrup | 43/42.09 |
| 1,740,335 | 12/1929 | Cowan | 43/42.09 |
| 1,776,090 | 9/1930 | Shroyer | 43/42.09 |
| 2,127,761 | 8/1938 | Beck | 43/42.33 |
| 2,190,791 | 2/1940 | Larson | 43/17.6 |
| 2,458,611 | 1/1949 | Long | 43/17.5 |
| 2,467,244 | 4/1949 | Van Hee et al. | 43/42.33 |
| 2,485,087 | 10/1949 | Diamond | 43/17.5 |
| 2,529,642 | 11/1950 | Vaughn et al. | 43/42.09 |
| 2,573,399 | 10/1951 | Cannon | 43/42.09 |
| 2,573,592 | 10/1951 | Nickel | 43/42.09 |
| 2,592,445 | 4/1952 | McCarthy | 43/42.33 |
| 2,593,792 | 4/1952 | Reckler | 43/42.33 |
| 2,599,035 | 6/1952 | Wing | 43/42.33 |
| 2,663,112 | 12/1953 | McMillin | 43/42.09 |
| 2,694,877 | 11/1954 | Wise | 43/42.33 |
| 2,884,732 | 5/1959 | Bailer | 43/42.33 |
| 2,897,623 | 8/1959 | Flournoy | 43/17.6 |
| 2,996,826 | 8/1961 | Lamar | 43/42.09 |
| 3,031,792 | 5/1962 | Swenson | 43/42.33 |
| 3,069,801 | 12/1962 | Mills | 43/42.09 |
| 3,077,046 | 2/1963 | Murray | 43/17.6 |
| 3,210,882 | 10/1965 | Purdom | 43/42.33 |
| 3,257,751 | 6/1966 | Benttinen et al. | 43/42.33 |
| 3,360,882 | 1/1968 | Belokin, Jr. | 43/42.33 |
| 3,423,868 | 1/1969 | Le Master | 43/42.33 |
| 3,528,188 | 9/1970 | Manross | 43/17.5 |
| 3,540,144 | 11/1970 | Gurka | 43/42.33 |
| 3,708,903 | 1/1973 | Bercz et al. | 43/17.6 |
| 3,863,380 | 2/1975 | Purlia | 43/17.6 |
| 3,895,455 | 7/1975 | Johnston | 43/17.6 |
| 3,921,328 | 11/1975 | Holcombe | 43/17.6 |
| 3,940,868 | 3/1976 | Northcutt | 43/17.6 |
| 3,969,839 | 7/1976 | Ziegler | 43/17.6 |
| 4,437,256 | 3/1984 | Kulak | 43/17.5 |
| 4,516,350 | 5/1985 | Malphrus | 43/17.6 |
| 4,581,839 | 4/1986 | Mattison | 43/17.6 |
| 4,589,221 | 5/1986 | Mattison | 43/17.6 |
| 4,610,103 | 9/1986 | Steinman | 43/17.6 |
| 4,638,584 | 1/1987 | Lindsay | 43/17.6 |
| 4,672,766 | 6/1987 | Mattison | 43/17.6 |
| 4,693,032 | 9/1987 | Mattison | 43/17.6 |
| 4,700,504 | 10/1987 | Mattison | 43/17.6 |
| 4,709,499 | 12/1987 | Ottaviano | 43/17.6 |
| 4,741,120 | 5/1988 | Cota et al. | 43/17.6 |
| 4,751,788 | 6/1988 | Mattison | 43/17.6 |
| 4,771,724 | 9/1988 | Baretz et al. | 116/202 |
| 4,777,756 | 10/1988 | Mattison | 43/17.6 |

(List continued on next page.)

OTHER PUBLICATIONS

A copy of p. 11 of the Cabella's® Tackle Shop 1999 Fishing Speciality Catalog. Item G on p. 11 is the "Arc Minnow™".
Photocopies of the informational card for a Yo–Zuri® which was purchased from Cabela's® Tackle Shop 1999 Fishing Speciality Catalog.
Photocopies showing the Arc Minnow™ crankbait from the top, bottom, and both sides.

*Primary Examiner*—Robert P. Swiatek
*Assistant Examiner*—Darren W. Ark
*Attorney, Agent, or Firm*—Kinney & Lange

[57] ABSTRACT

A fishing lure which includes a crankbait body has a cavity in the lower surface of the body. An elongated insert (which may be a chemiluminescent tube or a colored tube) is positioned in the cavity so that the element is exposed below and on both sides of the crankbait body. The chemiluminescent element is releaseably held in place by a bias spring, a loop located near the forward end of the cavity, or by flexing the element so that it is captured by recesses at the front and rear ends of the cavity.

6 Claims, 4 Drawing Sheets

U.S. PATENT DOCUMENTS

| | | | |
|---|---|---|---|
| 4,800,670 | 1/1989 | Mattison | 43/17.6 |
| 4,823,497 | 4/1989 | Pierce | 43/17.6 |
| 4,839,983 | 6/1989 | Pippert | 43/17.6 |
| 4,879,831 | 11/1989 | Herrlich | 43/17.6 |
| 4,888,904 | 12/1989 | Douglas, Jr. | 43/17.6 |
| 5,036,617 | 8/1991 | Waldrip | 43/42.33 |
| 5,043,851 | 8/1991 | Kaplan | 362/34 |
| 5,067,051 | 11/1991 | Ladyjensky | 362/34 |
| 5,157,857 | 10/1992 | Livingston | 43/17.6 |
| 5,195,266 | 3/1993 | Troescher | 43/17.6 |
| 5,213,405 | 5/1993 | Giglia | 362/34 |
| 5,224,285 | 7/1993 | Kamin et al. | 43/42.09 |
| 5,446,629 | 8/1995 | Steiger et al. | 362/34 |
| 5,495,690 | 3/1996 | Hunt | 43/17.6 |
| 5,552,968 | 9/1996 | Ladyjensky | 362/34 |

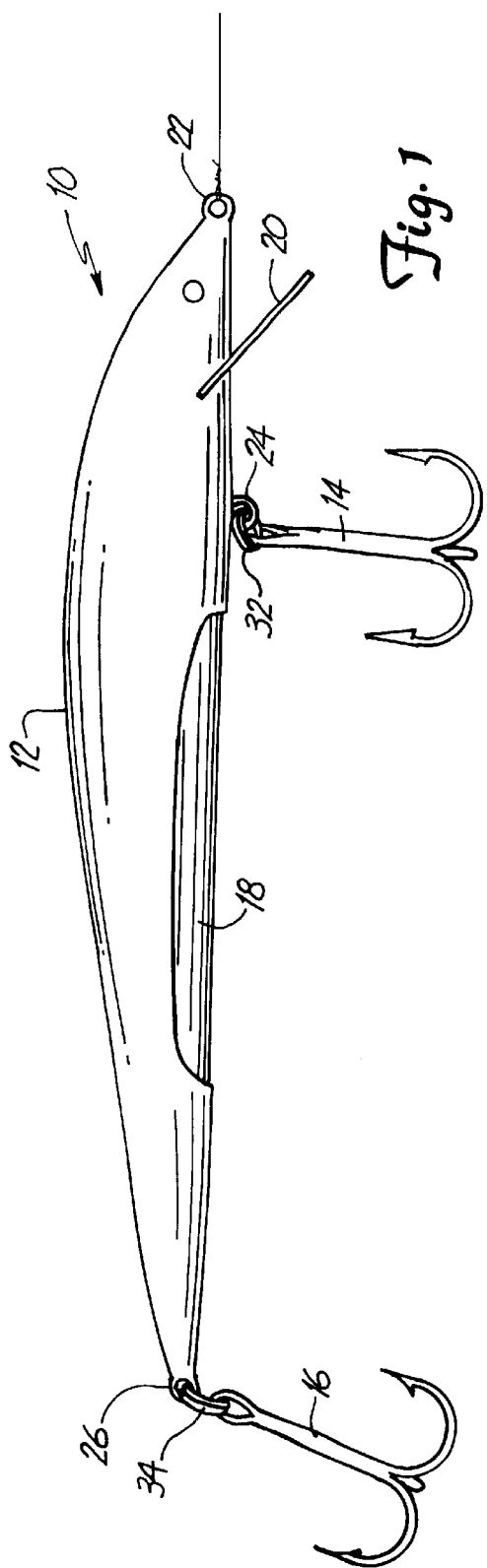
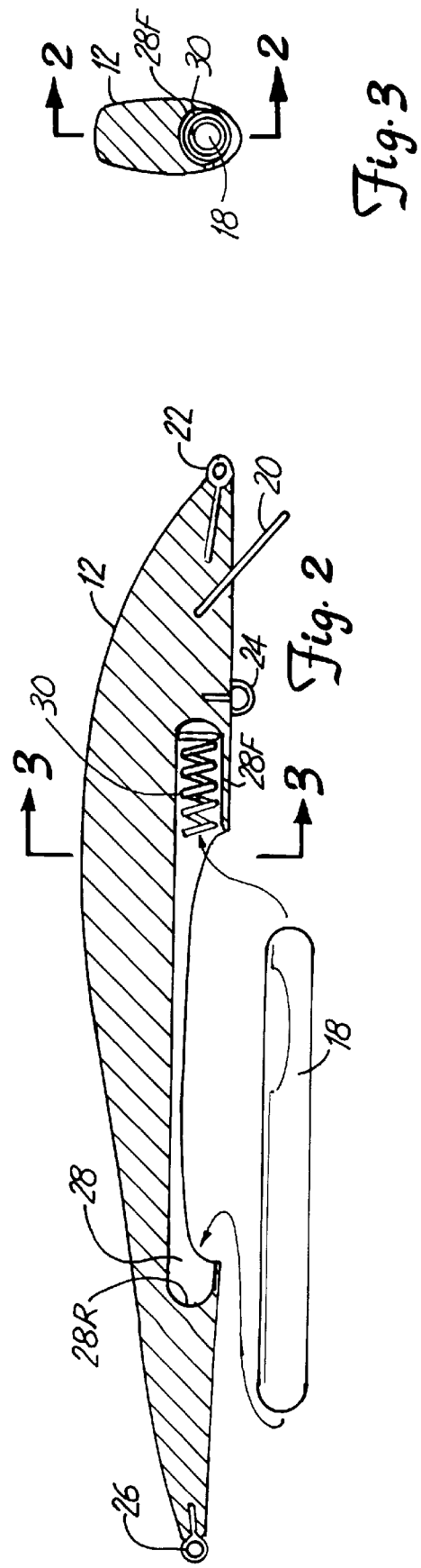

1

FISHING LURE

CROSS-REFERENCE TO RELATED APPLICATION(S)

None.

BACKGROUND OF THE INVENTION

The present invention relates to a fishing lure. In particular, the present invention is a crankbait which carries a tubular insert (such as a chemiluminescent or colored tube) element which is exposed below and on both sides of the crankbait body.

Fishing is among the most popular recreational sports. Anglers are of all ages and from virtually all walks of life. In the United States, it is estimated that between 40 and 60 million people go fishing every year.

There is a never ending quest for more effective fishing lures. Lures of all shapes, colors, and sizes have been used in attempts to attract fish and increase fishing success. Fish can be attracted by the sight, sound, and smell of lures.

In the past, various attempts have been made to develop a lighted lure which would be useful in attracting fish during low-light conditions. These conditions may occur during evening hours, during overcast days, and even on brightly lit days when water clarity is low. Examples of lighted fishing lures include the following patents: Bercz, et al. U.S. Pat. No. 3,708,903; Murphy U.S. Pat. No. Des. 381,734; Northcutt U.S. Pat. No. 3,940,868; Kulak U.S. Pat. No. 4,437,256; Malphrus U.S. Pat. No. 4,516,350; Cota, et al. U.S. Pat. No. 4,741,120; Douglas, Jr. U.S. Pat. No. 4,888,904; Kaplan U.S. Pat. No. 5,043,851; Ladyjensky U.S. Pat. No. 5,067,051; Livingston U.S. Pat. No. 5,157,857; Troescher U.S. Pat. No. 5,195,266; Giglia U.S. Pat. No. 5,213,405; Steiger, et al. U.S. Pat. No. 5,446,629; Hunt U.S. Pat. No. 5,495,690; and Ladyjensky U.S. Pat. No. 5,552,968.

BRIEF SUMMARY OF THE INVENTION

The fishing lure of the present invention is a crankbait which includes a crankbait body having a cavity in its lower surface. A elongated insert (such as a chemiluminescent element or a colored tube) is positioned in the cavity so that the insert is exposed below it on both sides of the crankbait body.

The insert is releaseably held in place in the cavity. In preferred embodiments, the element is held in place by a bias spring, by a loop located near a forward end of the cavity, or by flexing the element so that it is captured by recesses at the front and rear ends of the cavity.

In another embodiment of the present invention, the fishing lure is part of a kit which includes a crankbait body and a set of inserts. The inserts can include chemiluminescent tubes, as well as inserts which are not light emitting, but which have different colors. As a result, the same crankbait body can be modified to present different appearances, including those which are light emitting in order to attract fish or trigger striking of the lure under a variety of different conditions.

BRIEF DESCRIPTION OF THE DRAWINGS

FIG. 1 is a side elevational view of one embodiment of the fishing lure of the present invention.

FIG. 2 is a cross sectional view of the fishing lure of FIG. 1 taken along section 2—2 of FIG. 3.

FIG. 3 is a cross sectional view of the fishing lure of FIGS. 1 and 2 taken along section 3—3 of FIG. 2.

2

Figure 4:
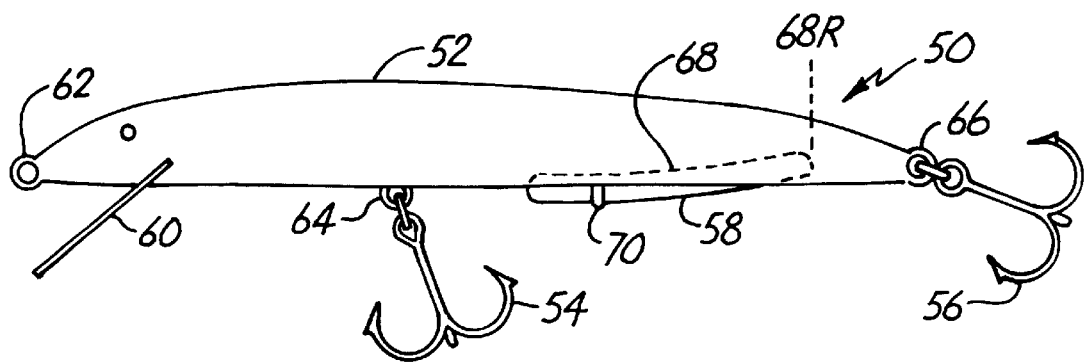

FIG. 4 is a side elevational view of a second embodiment of the fishing lure of the present invention.

Figure 5:
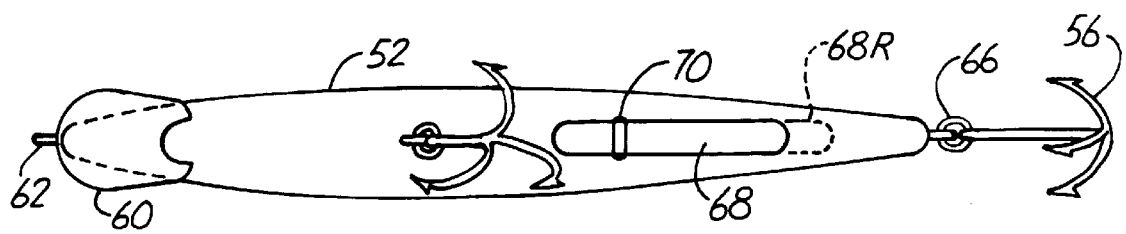

FIG. 5 is a bottom view of the fishing lure of FIG. 4.

Figure 6:
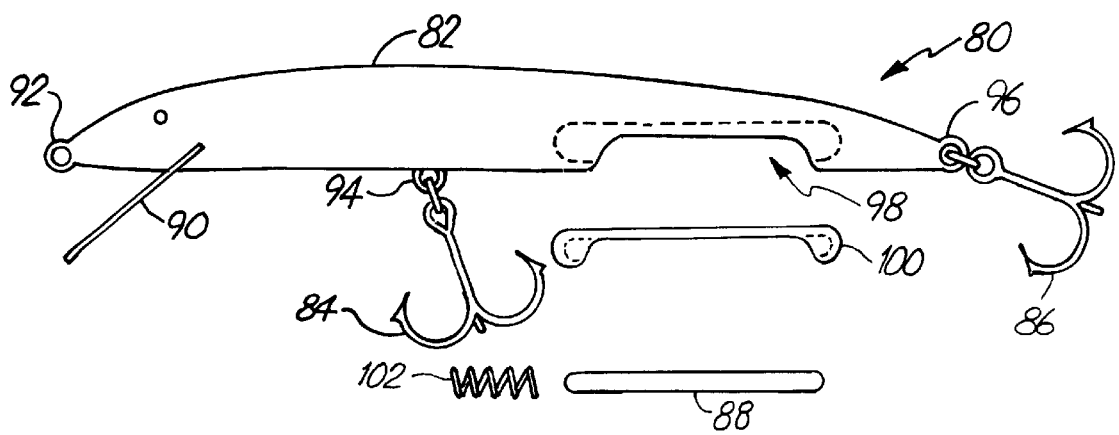

FIG. 6 is an exploded view of a third embodiment of the fishing lure of the present invention.

Figure 7:
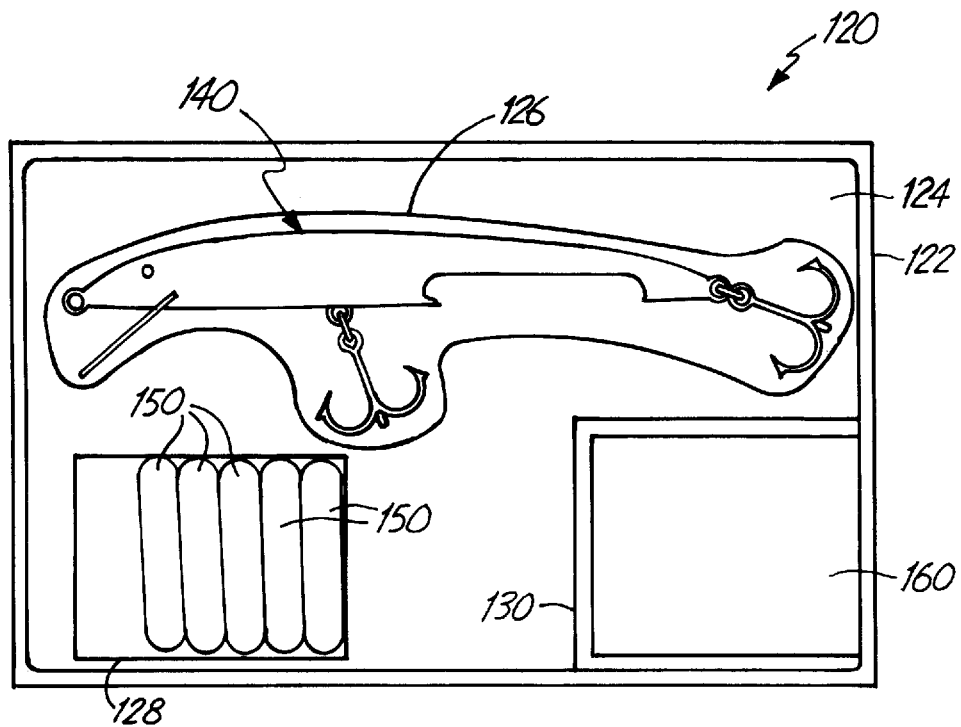

FIG. 7 is a fishing lure kit which includes a crankbait and a set of tubular inserts.

Figure 8:
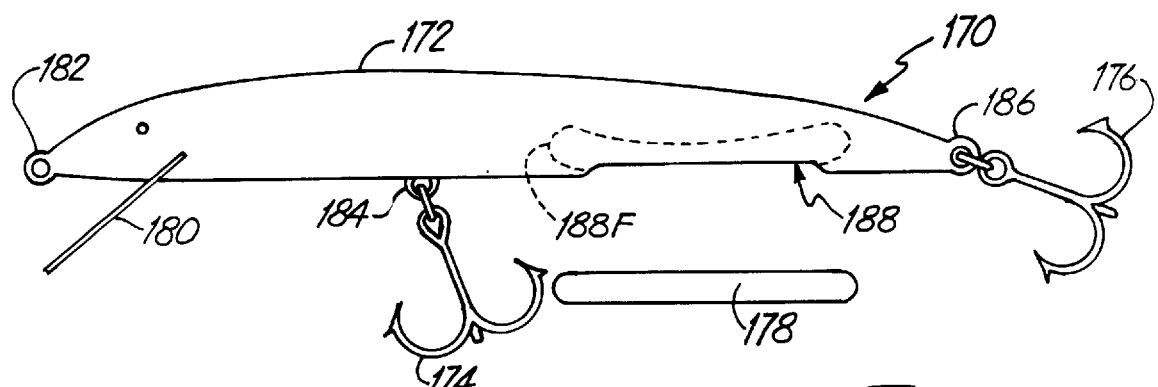

FIG. 8 is an exploded view of another embodiment of the fishing lure of the present invention.

Figure 9:
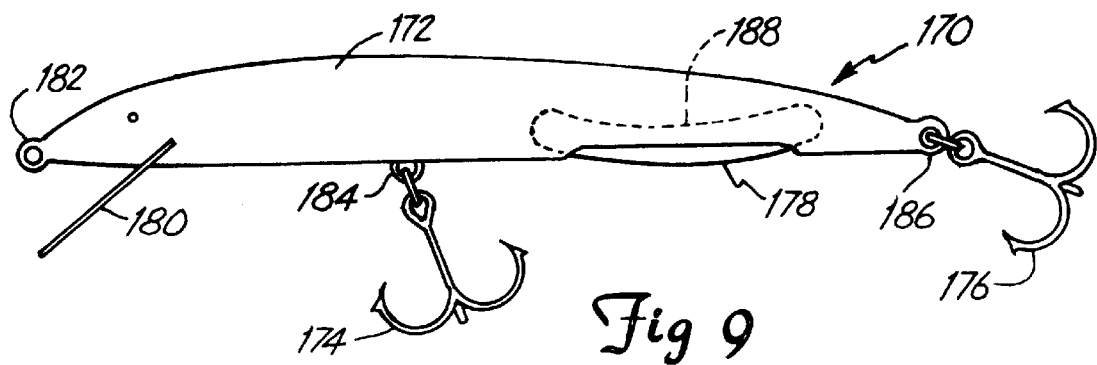

FIG. 9 is an assembled view of the fishing lure of FIG. 8.

DETAILED DESCRIPTION

FIGS. 1–3 show a first embodiment of the present invention. Fishing lure 10 includes crankbait body 12, treble hooks 14 and 16, and chemiluminescent light source tube 18. Crankbait body 12 includes bill 20, front eyelet 22, bottom eyelet 24, and rear eyelet 26. On the underside or belly of crankbait body 12 is a longitudinal cavity 28. Bias spring 30 is positioned in forward end pocket 28F of cavity 28.

When chemiluminescent tube 18 is positioned within cavity 28, the rear end of tube 18 is received in rear end pocket 28R of cavity 28. The front end of tube 18 presses against bias spring 30, and is captured within forward end pocket 28F of cavity 28. Cavity 28 is shaped so that tube 18 is exposed on both sides and the bottom of crankbait body 12.

Front eyelet 22 is connected to a fishing line either directly by tying, or through a connector such as a snap or snap swivel.

Treble hook 14 is connected to lower eyelet 24 by split ring 32. Similarly, rear treble hook 16 is connected to rear eyelet 26 by split ring 34.

Chemiluminescent tubes are available from several sources and are available in different sizes and different colors. Typically, the chemiluminescent tube is activated by bending the tube until a snapping sound is heard, which breaks a seal separating two substances within the tube. The chemicals within the tube are then mixed by shaking the tube. Once activated, tube 18 is inserted within cavity 28. One form of chemiluminescent tube which has been used with the present invention is Cyalume® lightstick from Omniglow Corporation. Cyalume® is a registered trademark of American Cynamid Company. Cyalume® lightsticks are available in 1.5 inch (0.25 ml fluid) sizes in a number of different colors (including red and yellow). They are also available in a larger 7.5 mm ×75 mm size, which is used with larger crankbaits.

Another chemiluminescent tube which can be used with the present invention is the Firefly Lightstick from Bandi Co., Ltd. Seoul, Korea.

Light emitted from chemiluminescent tube 18 provides additional color or flash to the lure, and is particularly advantageous in low light conditions caused either by lack of water clarity, weather conditions, or the time of day.

Other colored tubes, which are not chemiluminescent, can also be inserted into cavity 28. For example, under certain conditions a red, orange, chartreuse, silver, or copper colored tube can provide additional color to lure 10 which may attract fish or trigger strikes. The present invention provides the flexibility of presenting different appearances with the same lure.

FIGS. 4 and 5 show another embodiment of the present invention. Lure 50 includes crankbait body 52, treble hooks 54 and 56, and tube 58 (which may be chemiluminescent or plain colored, as desired by the angler.

Crankbait body 52 includes bill 60, front eyelet 62, bottom eyelet 64, and rear eyelet 66. Longitudinal cavity 68 has a rear end 68R for capturing the rear end of tube 58. The forward end of tube 58 is captured and held in place by eyelet 70.

FIG. 5 shows cavity 68 with tube 58 removed. Treble hook 54 is also not shown in FIG. 5 for clarity.

As shown in FIG. 4, tube 58 is slightly flexed as it is held in place.

The Firefly Lightstick from Bandi Co., Ltd. has been found to have sufficient flexibility to allow it to perform while in a slightly flexed condition.

FIG. 6 shows still another embodiment of the present invention. Lure 80 is shown in an exploded view. Crankbait 82 carries a pair of treble hooks 84 and 86. A tubular insert 88, which may be a chemiluminescent tube or a tube of a selected color, is carried within crankbait body 82, with the sides and bottom of tube 88 exposed.

Crankbait body 82 has bill 90, front eyelet 92, lower eyelet 94, rear eyelet 96, and cavity 98. Positioned within cavity 98 are cavity liner 100 and bias spring 102. Liner 100 is preferably formed from a metal or plastic tube which is shaped to match the contour of the outer edge of cavity 98. Tube 88 is inserted into cavity 98 and into liner 100. Bias spring 102 acts on the forward end of tube 88 to hold the rear end of tube 88 within the rear portion of liner 100. In embodiments where crankbait body 82 is molded plastic, liner 100 is preferably inserted in a mold and crankbait body 82 is molded around it.

FIG. 7 shows an embodiment of the present invention which is in the form of a fishing lure kit 120. The kit includes container 122 with foam liner 124, which has cutout sections 126, 128, and 130.

Crankbait 140, which for example may be any one of the forms illustrated in FIGS. 1–6 (or the form illustrated in FIGS. 8 and 9) is positioned within cutout 126. Cutout 128 contains a number of different colored tubes 150. The tubes may be, for example, chartreuse, copper, red, yellow, and silver, as illustrated in FIG. 7, or may be a wide variety of other colors. Cutout 130 provides a storage space for sealed packages 160 which contain chemiluminescent tubes.

FIGS. 8 and 9 show another embodiment of the present invention. Lure 170 is shown in an exploded view in FIG. 8 and an assembled view in FIG. 9.

Lure 170 includes crankbait body 172, which carries a pair of treble hooks 174 and 176. Insert 178, which may be a chemiluminescent tube or a tube of a selected color, is carried within crankbait body 172, with the sides and bottom of insert 178 exposed.

Crankbait body 172 has bill 180, front eyelet 182, lower eyelet 184, and rear eyelet 186. Cavity 188, with front end pocket 188F and rear end pocket 188R, is located in the bottom surface of crankbait body 172. Insert 178 is inserted into cavity 188 by flexing tube 178 slightly so that it is arched as shown in FIG. 9. The forward end of insert 178 is located in and captured by front end pocket 188F. The rear end of insert 178 is located in and captured by rear end pocket 188R.

In the embodiment shown in FIGS. 8 and 9, the natural resiliency of tubular insert 178 facilitates its insertion into cavity 188, and its retention within cavity 188, during use of lure 170. Insert 178 can be removed simply by pulling downward on it so that one or both ends pop out of pockets 188F and 188R.

In each of the embodiments illustrated in FIGS. 1–9, the crankbait body has had the same general shape and hook configuration. It is well known that crankbaits come in a wide variety of different sizes and shapes, with varying numbers of hooks. Some crankbaits have bills and others do not. The location of the front eyelet can vary considerably. In some lures, the eyelet is located on the bill, while in others the eyelet is located on a top surface of the crankbait body.

The present invention is applicable to any of these crankbait configurations. The location of the insert may differ depending upon the specific shape of the crankbait. Although all of the embodiments illustrated have shown the cavity located in a lower surface of the crankbait body, the cavity can, alternatively, be located in an upper surface. In still other embodiments, more than one cavity can be located in the crankbait, such as on each side or on both top and bottom.

The present invention provides a simple and effective way to vary the appearance of a crankbait as needed and dictated by different fishing conditions. Different colors of inserts can provide a different appearance which may more closely match the appearance of bait fish in the body of water being fished, or may provide a color which triggers a strike because of lighting and water clarity conditions. The color choices can include an insert which is the same as the crankbait body. Similarly, the use of chemiluminescent tube inserts can provide for an increased visibility or flash to the crankbait in low light or poor water clarity conditions. Changes to the crankbait are made quickly and easily using the inserts, without the need to retie a new lure.

Although the present invention has been described with reference to preferred embodiments, workers skilled in the art will recognize that changes may be made in form and detail without departing from the spirit and scope of the invention.

What is claimed is:

1. A fishing lure comprising:

a crankbait body having a cavity in a bottom surface of the crankbait body, wherein the crankbait body is shaped to resemble a bait fish; and an elongated insert releasably positioned in the cavity so that at least a portion of the insert is exposed and directly viewable below and on both sides of the crankbait body, wherein the insert has a first end and a second end and the cavity has a front end and a rear end, and wherein the first end of the insert is positioned in the front end of the cavity and the second end of the insert is positioned in the rear end of the cavity; and a spring which biases the insert toward one of the ends of the cavity to releasably hold the insert in the cavity.

2. The fishing lure of claim 1 wherein the insert is a chemiluminescent element.

3. The fishing lure of claim 1 wherein the insert is a colored tubular element.

4. A fishing lure kit comprising:

a crankbait body having a cavity in a bottom surface of the crankbait body, wherein the crankbait body is shaped to resemble a bait fish; and a plurality of different elongated inserts which are releasably positionable within the cavity to alter an appearance of the crankbait body so that the inserts, when positioned in the cavity, are exposed and directly viewable below and on both sides of the crankbait body, wherein the insert has a first end and a second end and the cavity has a front end and a rear end, and wherein the first end of the insert is positioned in the front end of the cavity and the second end of the insert is positioned in the rear end of the cavity; and a spring which biases the insert toward one of the ends of the cavity to releasably hold the insert in the cavity.

5. The fishing lure kit of claim 4 wherein the inserts include chemiluminescent elements.

6. The fishing lure kit of claim 4 wherein the inserts include a plurality of different colored elements.

* * * * *